Patented Oct. 17, 1939

2,176,058

UNITED STATES PATENT OFFICE 2,176,058

POLYMERIZATION OF DRYING OIL

Solomon Caplan, New York, N. Y., assignor, by mesne assignments, to Harvel Research Corporation, a corporation of New Jersey No Drawing. Application November 6, 1936, Serial No. 109,469

3 Claims. (Cl. 260—407)

The present invention relates generally to a method of polymerizing organic compounds having unsaturated carbon bonds and to the products obtained thereby; and the present invention more particularly relates to the polymerization of hydrocarbons having unsaturated bonds by means of dialkyl sulphates and monoalkyl acid sulphates.

It is an object of the present invention to obtain polymerization of an unsaturated organic compound by means of a sulphate which is soluble in the organic compound.

Another object of the present invention is to use a dialkyl sulphate to promote polymerization in that group of unsaturated organic compounds which are identifiable as being polymerizable by concentrated or fuming sulphuric acid.

Another object of the present invention is to dissolve an alkyl sulphate, that is a monoalkyl acid sulphate or a dialkyl sulphate, in an unsaturated organic compound and produce polymerizing action of the dissolved alkyl sulphate on said unsaturated organic compound by means of heat applied to the solution.

Another object of the present invention is to obtain the polymerizing action of a sulphate compound on an unsaturated organic compound without the disadvantages of the use of sulphuric acid.

It is further an object of the present invention to polymerize the general class of phenols having unsaturated alkyl substituent groups by means of alkyl sulphates, including monoalkyl acid sulphates and dialkyl sulphates.

Other objects and advantages of the present invention will appear from the following disclosure of particulars of the present invention and from the claims appended hereto.

An advantage of the present invention is that dialkyl sulphates are soluble in unsaturated organic compounds in amounts required for polymerization, and that monoalkyl acid sulphates are partly soluble in unsaturated organic compounds. Further, monoalkyl acid sulphates and sulphuric acid, either or both together, are soluble in dialkyl sulphates and such solutions are soluble in unsaturated organic compounds. These solutions added to unsaturated organic compounds will cause polymerization of the unsaturated organic compounds when heat is used to produce the polymerizing reaction.

The following are given as examples of unsaturated organic compounds whose polymerization can be promoted by material selected from the group consisting of dialkyl sulphates and monoalkyl acid sulphates: acetylene; the unsaturated compounds in gas house drip and coal tar such as solvent naphtha, coumarone, indene, styrene, and so on; pine oil, limonene; citronella grass oil, lemon grass oil, vetiver grass root oil and the various and several unsaturated alcohol and aldehyde constituents of these oils such as geraniol, geranial, citronellal and citronellol; unsaturated fatty acid oils such as China wood oil; unsaturated fatty acids such as linoleic acid, linolic acid, and so on and the mono- and poly-glycerides of unsaturated fatty acids such as those found naturally in drying, semi-drying and nondrying oils, for example, the mono- and poly-glycerides of linolic acid, linoleic acid and so on, whether taken from the natural product or made artificially; cashew nut shell liquid and its phenolic constituents and phenolic derivatives such as cardol, anacardic acid, "Cardanol" and other phenolic distillates, and also distillate residues having unsaturated side chains; marking nut shell liquid and its phenolic constituents anacardol and the carboxylic phenols, its phenolic distillates and phenolic distillate residues having unsaturated side chains; Japanese lac and its phenolic constituents including urushiol; and in general those unsaturated organic compounds which can be polymerized with concentrated or fuming sulphuric acid with the aid of heat. It is here noted that the examples given which are phenols having an ortho or the para position unsubstituted can be reacted with an aldehyde, such for example as formaldehyde, either before, during or after the polymerization by the methods of the present invention.

Examples of dialkyl and monoalkyl acid sulphates suitable for the practice of the methods of the present invention the following are given: dimethyl sulphate, diethyl sulphate, dibutyl sulphate, dipropyl sulphate, diamyl sulphate and the mixed-alkyl sulphates such as ethyl butyl sulphate, butyl amyl sulphate, mono-ethyl acid sulphate, monopropyl acid sulphate, mono-isopropyl acid sulphate and so on.

Examples of particular applications of the methods of the present invention are: (1) to polymerize gum forming unsaturated organic compounds present in petroleum oils such as are used for lubrication subjected to high temperatures and removing the polymerization products from the part of the petroleum oils desired for lubrication;

(2) to produce an impregnation of a polymerized material within another body which comprises dissolving together a dialkyl sulphate and an unsaturated organic compound which can be polymerized with concentrated sulphuric acid, charging the resulting solution into the body to be impregnated, and applying heat to promote the polymerization of the unsaturated organic compound by the dialkyl sulphate; and (3) to make coumarone resins with the use of a dialkyl sulphate or of a monolkyl acid sulphate, or to control the polymerization reaction of concentrated or fuming sulphuric acid in making coumarone resin by dissolving the concentrated or fuming sulphuric acid in a dialkyl sulphate or a monoalkyl sulphate before adding to the material to be polymerized such as coumarone, indene, or gas house drip.

Further, polymerization products made with monoalkyl acid sulphates and dialkyl sulphates, particularly with the latter, are lighter in color than those made with sulphuric acid alone due apparently to the fact that the reaction is more gentle and gradual than the rapid and comparatively violent reaction of sulphuric acid, the heat of the exothermal reaction being generated over a greater extent of time and therefore more easily dissipated than the sudden heat produced when sulphuric acid alone reacts. The same or similar advantage is attendant upon the use of a solution of sulphuric acid in a dialkyl sulphate for polymerization because the sulphuric acid acts as though it were not released for the polymerization reaction until a corresponding amount of the solvent dialkyl sulphate is used up, and as pointed out above, the reaction of the dialkyl sulphate is much more gradual than that of sulphuric acid alone, the gradual release of the sulphuric acid also serving to control the rate of the polymerizing reaction.

The solutions of polymerizable unsaturated organic compounds and alkyl sulphates, both the dialkyl sulphates and the monoakyl acid sulphates, are stable at normal temperatures, that is polymerization does not take place until heat is applied. There are several advantages to this among which is the suitability of such a solution for making impregnations and then promoting the polymerization reaction by application of heat after the material has been properly impregnated. Another advantage is that complete and thorough mixing of the two materials can be made at normal temperatures and before heat is applied to promote polymerization. Also another advantage is that polymerization can be carried on to a desired degree to obtain a predetermined viscosity after which polymerization is retarded or stopped by cooling. This advantage of stability at normal temperatures is also present in cases where concentrated sulphuric acid is dissolved in an alkyl sulphate and the resulting solution dissolved in a polymerizable unsaturated organic compound.

Examples of particular materials and methods used in the practice of the present invention are as follows:

*Example I.*—In one hundred parts by weight of China wood oil, ten parts of diethyl sulphate were dissolved and the solution heated overnight at 105° C. The product was a rubber mass suitable for milling into rubber, or for making varnishes with driers and so on by methods commonly used for making varnishes, and for other purposes.

*Example II.*—Into one hundred parts by weight of styrene are mixed five parts of diethyl sulphate and the solution heated for three hours at 140° C. and then for three hours at 120° C. A hard brittle resin is formed which is suitable for use in lacquers, varnishes and in molded compositions.

*Example III.*—Into one hundred parts by weight of a fraction of gas house drip oil boiling between 150° C. and 200° C. and containing indene and coumarone were dissolved five parts of diethyl sulphate and the solution heated for three hours at 140° C. and then for three hours at 120° C., a hard brittle resin being obtained which is suitable for use in lacquers, varnishes, molded compositions, and for other uses to which cumar resin is used.

The products of the method of the present invention are polymers of the materials used for producing them, that is, the products of the methods of the present invention have higher molecular weights and higher softening points than those of the materials used for producing them. In some cases the polymerization has been carried on to a point where softening of the product under heat does not take place before carbonization would occur.

With the methods of the present invention uniform polymerization throughout the mass being treated can be obtained more easily than with the use of concentrated or fuming sulphuric acid and local burning or charring does not occur. With the methods of the present invention there is also the advantage that sulphur dioxide is not produced in such heavy volume as with concentrated sulphuric acid or fuming sulphuric acid.

The particular examples of the methods of the present invention and of examples of the application of the methods of the present invention are given as illustrations toward the adding and teaching of the methods of the present invention to the art and are not for the limitation of the claims hereof.

Having thus described my invention, what I claim and desire to protect by Letters Patent is:

1. The method of polymerizing China wood oil which comprises dissolving diethyl sulphate in China wood oil and heating to about 105° C. to a predetermined degree of polymerization.

2. The method of polymerizing China wood oil which comprises dissolving an acid polymerization promoting agent in China wood oil and heating to a predetermined degree of polymerization, said acid polymerization promoting agent being material selected from the group consisting of the alkyl esters of sulphuric acid: dialkyl sulphates and monoalkyl acid sulphates, and solutions of sulphuric acid in alkyl esters of sulphuric acid.

3. The method of polymerizing a drying oil having a conjugated double bond which comprises heating a solution of an acid polymerization promoting agent in said drying oil to a predetermined degree of polymerization, said polymerization promoting acid being selected from the group consisting of the alkyl esters of sulphuric acid: dialkyl sulphate and monoalkyl acid sulphate, and solutions of sulphuric acid in alkyl esters of sulphuric acid.

SOLOMON CAPLAN.